Figure 1:
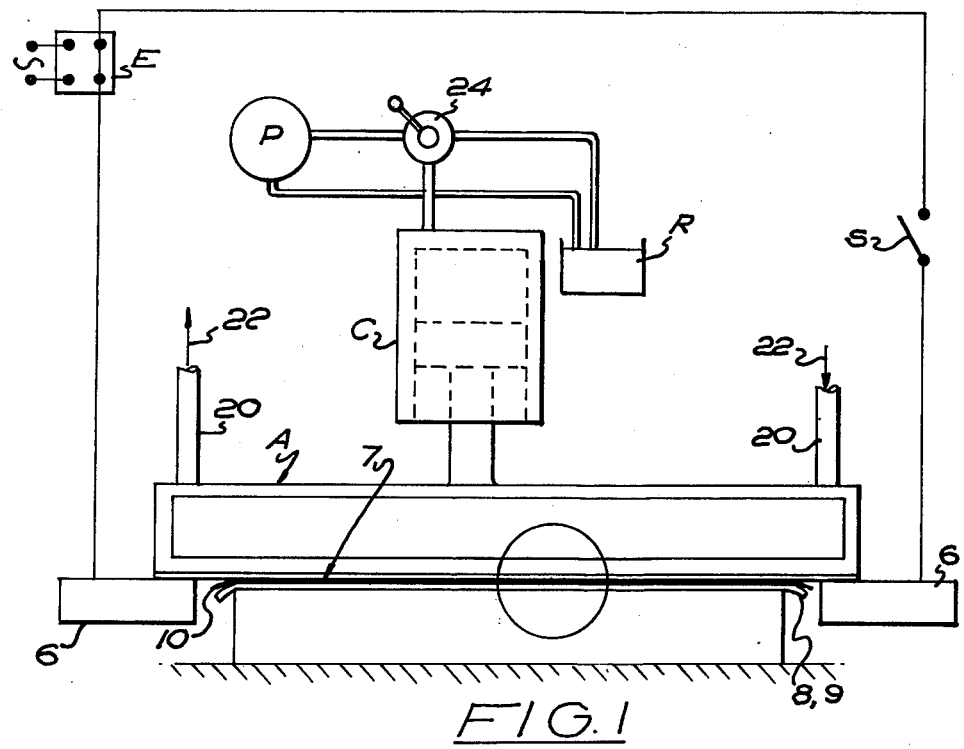

United States Patent [19]
Ingham

[11] 3,879,251
[45] Apr. 22, 1975

[54] APPARATUS FOR PRODUCING LAMINATES REQUIRING THE APPLICATION OF HEAT

[75] Inventor: Robert Edward Ingham, Burton Leonard, England

[73] Assignee: R. E. Ingham & Co., Limited, Burton Leonard, Harrogate, England

[22] Filed: Dec. 4, 1972

[21] Appl. No.: 312,036

[30] Foreign Application Priority Data
Dec. 7, 1971 United Kingdom............... 56658/71

[52] U.S. Cl. ................ 156/311; 156/498; 156/499
[51] Int. Cl. .............................................. C09j 5/06
[58] Field of Search ........... 156/282, 311, 323, 498, 156/499, 583; 161/209, 250; 144/309 R, 317; 219/78

[56] References Cited
UNITED STATES PATENTS 2,054,869  9/1936  Smolak .......................... 161/250 X
3,047,051  7/1962  Matveeff .......................... 156/539
3,345,247  10/1967  Mahar et al. ...................... 161/247
3,397,633  8/1968  Harris ............................ 156/583 X Primary Examiner—William A. Powell
Assistant Examiner—Brian J. Leitten
Attorney, Agent, or Firm—Wolf, Greenfield & Sacks

[57] ABSTRACT

The process of laminating a flexible thermoplastics sheet to a rigid base sheet using a thermoplastic adhesive which is heat activated wherein a web like electrical element is applied to the sheets whilst they are clamped in a laminating press, the power input for the heating process requiring an electrical input of from 4 KVA to 12 KVA per square foot of element which is applied for a period of 4 seconds to 18 seconds. One of the platens is cooled to serve as a heat sink so that during heating heat flows not into the laminate, but also into the heat sink, and after the input power is removed, the laminate remains clamped for a cooling period whilst heat flows from the laminate into the heat sink.

3 Claims, 2 Drawing Figures

APPARATUS FOR PRODUCING LAMINATES REQUIRING THE APPLICATION OF HEAT

This invention relates to a method of laminating a sheet of thermoplastics material to another sheet of material which may also be of thermoplastics material, but more often will be of another material. The method involves the use of a thermoplastic adhesive or an adhesive which is thermoplastic in nature. Most thermoplastic adhesives can be activated at a temperature in the range 120° to 180°C to bond the sheets to be laminated, and therefore by the expression "thermoplastic in nature" as applied to adhesives as mentioned above is intended to mean adhesives which, although not strictly, by conventional definition, thermoplastic adhesives, bond or activate at a temperature in the range 120°C to 180°C and bond to thermoplastics sheets. For simplicity of description, reference will be made hereinafter and in the appended claims only to thermoplastic adhesives, it being understood that such expression is intended to cover adhesives which are thermoplastic in nature as mentioned above.

The invention furthermore relates to a laminating press for carrying out the method of the invention.

Conventionally, laminating using heat curing adhesives has involved the use of a press having at least two platens (sometimes more) between which the layers of the laminate are clamped. The platens are heated by circulating steam or other heating medium therethrough to cure adhesive located between the opposed faces of the layers to be laminated together. It should be noted here that sometimes more than two layers are laminated in the process. After the heating of the layers whilst held clamped together, the platens are subsequently cooled, conventionally by circulating cooling medium through the platens, the layers being held clamped during the cooling process. In using this process for laminating thermoplastic sheets and adhesive, requiring the temperature at the adhesive to be raised to somewhere in the range 120°C to 180°C, the heating period may be of the order of 30 to 40 minutes and the cooling period may be 10 minutes.

This process involves a considerable waste of time and energy because thermoplastics adhesives do not require a prolonged curing time, and a main object of the invention is to provide a method of laminating together two sheets, one at least of which is a thermoplastics sheets, by means of a thermoplastic adhesive, wherein the heating time is considerably reduced.

A further object is to provide a method wherein the heat is applied to the laminate in a novel manner achieving more efficient utilization of the heat than in the conventional process.

A further object of the invention is to provide a method of laminating two sheets, one of which is a sheet of flexible thermoplastics material and the other is a rigid base sheet member, by means of a thermoplastics adhesive, wherein the applied heat penetrates the rigid base sheet through the the thermoplastics sheet to the desired depth to achieve activation of the adhesive and bond the sheets, to an extent which is insufficient to dry out the base sheet to an extent to cause distortion of the base sheet.

A still further object of the invention is to provide a method wherein the cooling period of the cycle can be reduced.

A still further object of the invention is to provide or adapt a laminating press which is suitable for carrying out the method of the invention.

According to the invention, in its broadest aspect, a method of laminating two sheets, one at least of which is a thermoplastics sheet, by means of thermoplastics adhesive, comprises clamping the sheets together by means of a pair of press platens and applying the heat to cure the thermoplastic adhesive between the opposed faces of the sheet by means of a flat, sheet-like electrical heating element located between one of the sheets and the adjacent platen.

The said heating element is preferably supplied with 4 to 12 KVA electrical power per square foot of element, the power being applied for a period of from 4 to 18 seconds inclusive.

The platen adjacent said element is preferably arranged to act as a heat sink, because the element, being in sheet form will be of relatively small heat capacity as compared to the platen. Thus, during heating heat flows both to the laminate and to the heat sink, and therefore the supply of electrical power must be sufficient to supply that which flows to the platen and that which flows into the laminate. Although this may appear as a waste of energy, it does achieve an advantage when the process includes a cooling period, the laminate remaining clamped during this period, because, just as heat flows from the element into the heat sink during heating, so heat in the laminate flows through the element and into the heat sink during the cooling period, reducing this period considerably as compared with the cooling period of the conventional method.

The thermal capacity of the heat sink may be increased when a hollow platen is used and this is filled with cooling medium, which may be continuously or intermittently circulated through the platen during the whole of the heating and cooling periods.

It is important from a practical point of view that the heating period should be sufficiently long to enable the heat from the element to penetrate the laminate to the adhesive to be activated.

If the platen is an electrical conductor there will be one electrical insulator separating the element from the platen. The heat transfer as well as the heat capacity (specific heat) characteristics of such an insulator will vary somewhat the heat flow into the platen generally speaking, and depending upon the material and/or thickness of insulator the poorer the conductor of heat that the insulator is, then the lower the power input required and the longer the period of heating and cooling, and the better the conductor of heat that the insulator is, the higher the power input required and the shorter the heating and cooling times.

With the same insulator or element, one test has shown that in the laminating of a sheet of polyvinylchloride to a wood veneered chipboard a power input of approximately 4 KVA per square foot of element needs to be applied for 18 seconds before the laminate reaches the desired temperature in the range 120°C to 180°C, whilst the desired laminate temperature is reached in approximately 4 seconds when the power applied is 12 KVA per square foot of element just as 4 seconds is rather short to enable the heat to penetrate the laminate sufficiently, 18 seconds is rather long from a practical point of view. With the same materials, good results were obtained with a power supply of approximately 6.5 KVA per square foot of element applied for 8 seconds.

Simultaneously with the laminating process, where polyvinylchloride is being laminated to wood veneer, the p.v.c. may be provided with the wood grain effect which is the subject of U.S. Pat. No. 3,729,368 granted on Apr. 24, 1973 to Robert E. Ingham and Geoffrey W. Deith.

Usually, the laminate will include a sheet of thermoplastics material and a rigid base sheet. This base sheet may be a laminate in itself, i.e., sheet of chipboard or hardboard to which a layer of wood veneer has been applied. In such cases, the thermoplastics material will be such as to enable the veneer to be viewed therethrough after lamination, but if the rigid sheet is a single sheet of hardboard or chipboard, or the like, the plastics sheet may be opaque and may be provided with a pattern or other decorative effect. There may be other sheets such as metal foils or paper in the laminate, these being attached during the laminating process.

Furthermore, there may be two thermoplastics sheets, one located to each side of a base sheet, in the laminate, and in such case, the method would include using two heating elements one to each side of the base sheet and adjacent the respective platens.

Where the sheets of the laminate are bigger than the platens, they may be laminated in stages, the sheets being moved appropriately after each section has been laminated.

Also, according to the invention there is provided a laminating press for carrying out the method as aforesaid comprising spaced platens between which sheets to be laminated can be pressed, means for pressing the platens together, a flat, sheet-like heating element attached to one of said platens and adapted for connection to an electrical supply so as to apply heat to a laminate clamped between the platens for the activating of the adhesive by which the sheets of the laminate are to be attached, said element being capable of withstanding electrical power supplies thereto of 4 to 12 KVA per square foot of element by being attached to the platen by means allowing flow of heat from the element to the platen.

The said element preferably includes a resistance wire mesh to which the electrical power is applied to generate the heat for the laminating process. A suitable material for the wire mesh is the metal alloy known as monel which has the desirable property that it tends not to change its resistance despite temperature changes. By providing the element in web or sheet form it will have a relatively small heat capacity at least as compared to the platens and will be capable of being elevated quickly to a high temperature, enabling quick generation of sufficient heat to heat the laminate and make up for the loss to the platen.

The platen continues to act as a heat sink after the heating period and provides the subsequent cooling of the laminate upon cutting off of the electrical power supply to the element and the cooling effect will be applied quickly to the laminate, again the low heat capacity of the element reducing the cycle time.

In a preferred case, the heating element is spaced from the platen by means of a layer of heat insulating material of accurately controlled thickness to give the desired heat transfer during the heating and cooling phases of the cycle.

The design and construction of the heating element will depend upon the temperature desired and this will of course depend upon the materials to be laminated, bearing in mind the requirement for the generation of the excess heat lost to the platen during the heating phase of the cycle; in this specification there are set forth technical details of tests which have been carried out and have shown successfully the viability of the invention. It is appreciated that within the scope of the invention much testing in regard to construction of the element, heating times, power inputs, platen pressure, remains to be done.

Figure 2:
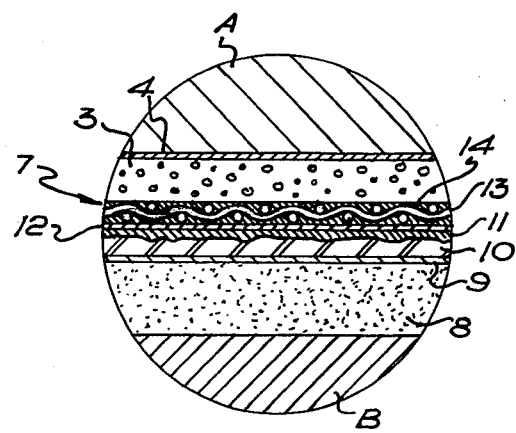

An embodiment of the invention will now be described by way of example, with reference to the accompanying diagrammatic drawings wherein;

FIG. 1 is a sectional elevation of a laminating press according to the invention, the press being shown with a laminate between the platens thereof; and FIG. 2 shows, in enlarged section, the detail ringed in FIG. 1.

Referring to the drawings, the press comprises basically two metal press platens namely an upper press platen A which is hollow and through which a heating or cooling medium such as steam or water can be passed, as indicated by pipe connections 20 and arrows 22, and a lower press platen B. Platens A and B are pressed together, with a pressure of approximately 60 – 80 p.s.i. by hydraulic ram C during the laminating of, in this case, a polyvinyl chloride sheet 10 and a base sheet comprising a thick chipboard base 8 to which has previously been attached a wood venner layer 9, the wood veneer layer 9 having previously been coated with a thermoplastic adhesive.

As the polyvinylchloride 10 is being laminated to a veneer layer 9, it is covered by means of a synthetic plastics foil 11 of polyethylene because simultaneously with the laminating of the sheet 10 to veneer 9, the upper surface of sheet 10 is provided with the grain effect the subject of U.S. Pat. No. 3,729,368. The foil 11 is covered by means of a release film 12 such as a silicone release paper.

To the underside of the upper press platen A there is bonded an electric heating element 7 which is in web or sheet form and which includes a woven 100 mesh metal alloy gauze web 13 which is embedded in or at least coated with bonding adhesive 14.

The mesh 13 is separated from the platen face by an impregnated asbestos heat insulator 3, and the insulator 3 in its turn is secured to the platen face by an adhesive layer or coating 4 (see FIG. 2). This coating or layer 4 is preferably of such a nature that it can be softened, by heating platen A, for example by passing steam therethrough, so that the element can be removed from the platen if desired. The asbestos layer 4 is impregnated with a phenolic resin and the bonding adhesive with which the mesh is coated or in which the mesh is embedded may be a ceramic adhesive such as "fortafix" or a silicone resin. The surface of the element facing the laminate is sanded smooth so that a smooth surface will contact the top layer of the laminate.

In performing the laminating operation, the press is closed by manually adjusting one way valve 24 to cause pump to supply pressure fluid from reservoir R to bring together the platens A and B as shown in FIG. 1 and an electric current is applied to low voltage electrodes 6 from a transformer E or other electrical power source by closing switch 5 as shown in FIG. 1. Electrodes 6 connect with the mesh of the heating element 7 such as to give an element loading of about 6 KVA per square foot of element and for about 10 seconds, at the end of which the surface of the laminate reaches approximately 150°C. After switching off the electric current, a further period of approximately 15 seconds is allowed during which the pressure between the platens A and B is maintained and during which the element cools to normal temperature and after this period the press can be opened and the laminate removed.

In the cycle of operation as outlined above, the heat generating element in web form is separated from the heat sink ie the platen A, by a controlled amount of heat insulating material and the power input is sufficient to provide heat both to perform satisfactorily the laminating step, and to supply the flow of heat from the element through the insulating material to the heat sink. For example, the rate of heat generated may be twice that actually required for the laminating step. The rate of heat flow into the heat sink will depend upon the heat capacity of the element or its insulation and the platen temperature. The temperature can be regulated by cooling medium. Thus the platen may be filled with cooling medium and this medium furthermore can be circulated intermittently or continuously during or between the heating and/or cooling periods of each or subsequent laminating processes.

In such example, the heat flow from the element may be half to the laminate and half to the cooled platen. Upon removal of the heating current, assuming the same cooling effect by the platen A, the same heat passing to the platen will be maintained for a short time, but during this time, the heat flow is from the laminate, cooling same, because the element is of low heat capacity and quickly loses any heat therein upon removal of the heating current.

The total thickness of the element in the example including the thickness of the asbestos insulator is approximately 0.55 inch, this thickness being critical both to the heating time and cooling time. For variation of these times thicker or thinner insulation may be used. For example thicker insulation will give more rapid heating of the laminate because there will be less heat loss to the cooled platen but such an arrangement will give a slower cooling time.

In another construction of the element the insulator sheet may be of glass fibre which is fully or partially impregnated with a resin, such as a phenolic, silicone or epoxy, or other special resin formulated for high temperature resistance, such as "Xylok," which is a condensation product of an aralkyl ether and a phenol. It is advantageous for the insulator to be made up in such a way as to have a heat capacity (Specific Heat) as low as possible, while being a good insulator. The metal alloy gauze in this construction is surrounded or closely backed by a material having a high specific heat, such as asbestos or a ceramic material. Such an element may be only approximately .040 inch thick, in total and for convenience in handling may be mounted on an aluminium sheet which in turn is adhered to the platen by means of a heat sensitive adhesive, such that the aluminium sheet and element can be removed by heating the platen as explained previously. With such an element, 8 seconds at a load of about 7 KVA per square foot followed by 12 seconds without power will successfully raise the polyvinylchloride film 10 on the surface of the veneered board 8 to 150°C and cool the laminate sufficiently for its removal from the press.

By the method of the invention described we have found that the cycle time for laminating two sheets of which one is a thermoplastics sheet, can be reduced to an overall period of one minute or in some cases less, and this compares favourably with using the known apparatus for the same process wherein the cycle time normally takes anything from one-half hour to 1 hour.

It will in some cases, be that because the element is longer or broader than the sheets to be laminated, regions of the element will overhang the laminate and may tend to overheat in the laminating process.

Control of the temperature at such regions during operation may be achieved by ensuring that the heat insulation valve of the insulator is low enough, and the capacity of the element is high enough, to absorb safely the energy input required for the laminating.

In some other cases, where the sheets of the laminate have a dimension which is much greater than the appropriate dimension of the element, such that the laminating of the sheets requires to be done in stages, the element may require to be built up at the edges of the mesh with nonelectrical conducting material in order to avoid the formation of line marks on the surface of the polyvinyl chloride which could be created by the mesh edges if the element were not built up as aforesaid.

What we claim is:
1. A method of laminating a thermoplastic sheet to the wood surface of a base sheet, comprising the steps of
   1. applying a thermoplastic adhesive between the wood surface and the thermoplastic sheet,
   2. clamping the sheets together between a first press platen constituting a heat sink and a second press platen,
   3. applying electrical power to a flat sheet-like electrical heating element situated between one of the sheets and the adjacent platen, the electrical power being in the range of 4 to 8 KVA per square foot of heating element area, and the electrical power being applied for a period of 4 to 18 seconds,
   4. and cooling the laminated sheets while they are clamped between the platens by cutting off the electrical power to the heating element and allowing the heat to drain from the laminate into the heat sink platen.

2. The method according to claim 1 wherein a hollow heat sink platen is employed, and the method further includes the step of
   5. causing a cooling fluid to circulate in the heat sink platen during the cooling of the laminated sheets.

3. The method according to claim 1, wherein the wood surface is constituted by a wood veneer upon the base sheet, and wherein in step (3.) the electrical power applied to the heating element is 6.5 KVA per square foot of heating element area and that power is applied for a period of 8 seconds before cutting off the power.

* * * * *